United States Patent
Viswanathan

(10) Patent No.: US 10,922,840 B2
(45) Date of Patent: Feb. 16, 2021

(54) METHOD AND APPARATUS FOR LOCALIZATION OF POSITION DATA

(71) Applicant: HERE Global B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 124 days.

(21) Appl. No.: 16/227,945

(22) Filed: Dec. 20, 2018

(65) Prior Publication Data

US 2020/0202560 A1 Jun. 25, 2020

(51) Int. Cl.
*G06T 7/73* (2017.01)
*G06K 9/00* (2006.01)
*G06K 9/62* (2006.01)

(52) U.S. Cl.
CPC ............ *G06T 7/74* (2017.01); *G06K 9/00791* (2013.01); *G06K 9/6202* (2013.01); *G06K 9/6232* (2013.01); *G06T 2207/10004* (2013.01); *G06T 2207/10028* (2013.01); *G06T 2207/10044* (2013.01); *G06T 2207/20084* (2013.01); *G06T 2207/30252* (2013.01)

(58) Field of Classification Search
CPC combination set(s) only.
See application file for complete search history.

(56) References Cited

U.S. PATENT DOCUMENTS

| | | | |
|---|---|---|---|
| 9,707,961 | B1 | 7/2017 | Haider et al. |
| 2017/0076455 | A1 | 3/2017 | Newman et al. |
| 2017/0132934 | A1* | 5/2017 | Kentley .............. G08G 1/202 |
| 2018/0099676 | A1 | 4/2018 | Goto et al. |
| 2018/0293466 | A1 | 10/2018 | Viswanathan |
| 2019/0303759 | A1* | 10/2019 | Farabet .............. G06K 9/4628 |
| 2019/0311205 | A1* | 10/2019 | Mittal ............... G06K 9/00798 |
| 2019/0311298 | A1* | 10/2019 | Kopp .................. G06K 9/6256 |
| 2020/0150652 | A1* | 5/2020 | Urano ................ B60W 50/082 |

FOREIGN PATENT DOCUMENTS

| | | |
|---|---|---|
| WO | WO 2013/117940 A2 | 8/2013 |
| WO | WO 2018/002910 A1 | 1/2018 |

OTHER PUBLICATIONS

S"oren Kammel,"Lidar-based lane marker detection and mapping,",2008 IEEE Intelligent Vehicles Symposium Eindhoven University of Technology Eindhoven, The Netherlands, Jun. 4-6, 2008, pp. 1138-1140.*

(Continued)

*Primary Examiner* — Omar S Ismail
(74) *Attorney, Agent, or Firm* — Alston & Bird LLP

(57) ABSTRACT

Methods, systems, apparatuses, and computer program products are provided that are configured to perform localization of position data, specifically using a trained localization neural network. In the context of an apparatus, the apparatus is caused to receive observed feature representation data. The apparatus is further configured to transform the observed feature representation data into standardized feature representation data utilizing a trained localization neural network. The apparatus is further configured to compare the standardized feature representation data and the map feature representation data and identify local position data based on the comparison.

20 Claims, 5 Drawing Sheets

(56) References Cited

OTHER PUBLICATIONS

Revilloud Marc,"Generator of Road Marking Textures and associated Ground Truth,",2012 15th International IEEE Conference on Intelligent Transportation Systems Anchorage, Alaska, USA, Sep. 16-19, 2012,pp. 934-937.*
Naoki Akai,"Reliability Estimation of Vehicle Localization Result," 2018 IEEE Intelligent Vehicles Symposium (IV)Changshu, Suzhou, China, Jun. 26-30, 2018,pp. 740-746.*
F. Schuster,"Robust Localization based on Radar Signal Clustering," 2016 IEEE Intelligent Vehicles Symposium (IV) Gothenburg, Sweden, Jun. 19-22, 2016,pp. 839-842.*
Luca Caltagirone,"Fast LIDAR-based Road Detection Using Fully Convolutional Neural Networks," 2017 IEEE Intelligent Vehicles Symposium (IV)Jun. 11-14, 2017, Redondo Beach, CA, USA,pp. 1020-1023.*
Álvaro Arcos-García,"Deep neural network for traffic sign recognition systems: An analysis of spatial transformers and stochastic optimisation nnethods," Neural Networks 99 (2018) 158-165,pp. 160-163.*
U.S. Appl. No. 16/174,892, filed Oct. 30, 2018; In re: Viswanathan; entitled *Method and Apparatus for Predicting Feature Space Decay Using Variational Auto-Encoder Networks*.
Dong, H. et al., *Unsupervised Image-to-Image Translation with Generative Adversarial Networks*, [online] [retrieved Apr. 25, 2019]. Retrieved from the Internet: <URL: http://arxiv.org/pdf/1701.02676.pdf>. (dated Jan. 10, 2017) 5 pages.
Kim, D-K. et al., *Satellite Image-Based Localization Via Learned Embeddings*, [online] [retrieved Apr. 25, 2019]. Retrieved from the Internet: <URL: https://arxiv.org/pdf/1704.01133.pdf> (dated Apr. 4, 2017) 8 pages.
Kousuke, Y. et al., *Use of Generative Adversarial Network For Cross-Domain Change Detection* [online] [retrieved Apr. 25, 2019]. Retrieved from the Internet: <URL: https://pdfs.semanticscholar.org/a13d/ac9255dd738932f463a8f462c11419f072db.pdf>, (dated Dec. 24, 2017) 6 pages.
Latif, Y. et al., *Addressing Challenging Place Recognition Tasks Using Generative Adversarial Networks*, [online] [retrieved Apr. 25, 2019]. Retrieved from the Internet: <URL: https://arxiv.org/pdf/1709.08810.pdf>, (dated Feb. 27, 2018) 7 pages.
Liu, M-Y. et al., *Unsupervised Image-To-Image Translation Networks*, [online] [retrieved Apr. 25, 2019]. Retrieved from the Internet: <URL: https://arxiv.org/pdf/1703.00848.pdf>, (dated Feb. 15, 2018) 11 pages.
Extended European Search Report for Application No. EP 19218150.1 dated May 25, 2020, 8 pages.

\* cited by examiner

METHOD AND APPARATUS FOR LOCALIZATION OF POSITION DATA

TECHNOLOGICAL FIELD

Embodiments of the present invention relate generally to a method, apparatus, and computer program product for localization of position data, and more specifically, for localization of position data that handles feature changes by approximating environment observations using a neural network trained to transform input data representing the observed environment feature to a representation that approximates the environment feature at a time an environment map was constructed.

BACKGROUND

Modern day vehicles utilize a plurality of sensors, for example cameras, Light Detection and Ranging (LiDAR), and radar, to accomplish various safety and navigation tasks. For example, some autonomous vehicles use at least LiDAR, cameras, and various other sensors to ensure navigation and control of the vehicle occurs properly and reliably. Sensors are used to capture representations of the environment including environment features ("features"). Autonomous vehicles may detect and/or interpret features to perform vehicle localization. For example, an autonomous vehicle may detect a lane line to determine the vehicle's position corresponding to a previously generated and/or stored archival environment map.

An appearance of a given feature may change over time, for example due to weather effects, lighting effects, weathering or degradation of the feature itself, or the like. Changes to a feature's appearance may cause the feature to be undetectable, or wrongly detected, by systems that perform such detection in real-time. For example, an autonomous vehicle system, such as a perception system, may fail to accurately detect and/or interpret a lane marker when the lane marker has been worn down over time. Inaccurate detection may lead to inefficiencies, for example through over-cautious behaviors. Inaccurate feature detection may also cause incorrect decision making, causing unreliable and/or incorrect decisions.

BRIEF SUMMARY

A method, apparatus and computer program product are therefore provided according to an example embodiment of the present invention for localizing position data, such as for real-time vehicle localization. In this regard, the method, apparatus, and computer program product of example embodiments utilize a neural network trained to transform an observed feature representation into a standardized feature representation that approximation a map feature representation captured at a time an environment map was constructed. In some embodiments, the standardized feature representation includes an overall feature context. In some embodiments, for example, the overall feature context includes associated weather conditions, an associated feature decay, an associated feature decay location, an associated feature decay severity, and the like. In turn, example embodiments facilitate localization of position data by comparing the standardized feature representation to a map feature representation. Accordingly, the method, apparatus, and computer program product of example embodiments facilitate localization, such as vehicle localization, automatically, without hand re-parametrizing comparisons between an observed feature representation and a map feature representation. Some example embodiments make no assumptions about the particular formats associated with map feature representations in an environment map. Thus, the method, apparatus, and computer program product of some example embodiments function even when map feature representations are represented differently than observed feature representations.

An example embodiment includes an apparatus comprising at least one processor and at least one non-transitory memory. In the example apparatus, the at least one non-transitory memory stores computer program code instructions. The computer program code instructions, when executed, by the at least one processor for example, are configured to cause the apparatus to receive observed feature representation data. In the example apparatus, the observed feature representation data represents an observed feature representation captured by a sensor at a first time, where the observed feature representation includes an environment feature affected by a first feature decay. The example apparatus is further caused to transform the observed feature representation data into standardized feature representation data utilizing a trained localization neural network. In the example apparatus, the standardized feature representation data represents a standardized feature representation including the environment feature affected by a second feature decay. The environment feature affected by the second feature decay approximates the environment feature affected by a third feature decay associated with a map feature representation captured at a second time. The example apparatus is further caused to compare the standardized feature representation data and the map feature representation data, where the map feature representation data represents the map feature representation captured at the second time. The example apparatus is further caused to identify localized position data based on the comparison of the standardized feature representation data and the map feature representation data, where the localized position data represents a localized position.

In an alternative example embodiment of the apparatus, the apparatus includes means for performing the above operations. For example, in an alternative example embodiment of the apparatus, the alternative embodiment includes means configured to receive observed feature representation data. The alternative example embodiment further includes means configured to transform the observed feature representation data into standardized feature representation data utilizing a trained localization neural network. The alternative example embodiment further includes means configured to compare the standardized feature representation data and the map feature representation data, where the map feature representation data represents the map feature representation captured at the second time. The alternative example embodiment further includes means configured to identify localized position data based on the comparison of the standardized feature representation data and the map feature representation data, where the localized position data represents a localized position.

In some embodiments of the example apparatus, the second time is during map construction. In some embodiments of the example apparatus, the observed feature representation data is in a raw data format. In some embodiments of the example apparatus, the observed feature representation data is in a pre-processed data format.

In some embodiments, the apparatus also includes means for outputting the localized position data. In some embodiments of the example apparatus, the apparatus includes means configured to output the localized position data. In some embodiments of the example apparatus, the trained localization neural network is a trained generative adversarial network. In some embodiments of the example apparatus, the second feature decay and the third feature decay are associated with a shared overall feature context.

Another example embodiment includes a method for position localization. The example method includes receiving observed feature representation data, where the observed feature representation data represents an observed feature representation captured by a sensor at a first time. In the example method, the observed feature representation includes an environment feature affected by a first feature decay. The example method further includes transforming the observed feature representation data into standardized feature representation data utilizing a trained localization neural network, where the standardized feature representation data represents a standardized feature representation including the environment feature affected by a second feature decay. In the example method, the environment feature affected by the second feature decay approximates the environment feature affected by a third feature decay associated with a map feature representation captured at a second time. The example method further includes comparing, utilizing a comparison function, the standardized feature representation data and map feature representation data, where the map feature representation data represents the map feature representation captured at the second time. The example method further includes identifying localized position data based upon the comparison of the standardized feature representation data and the map feature representation data, where the localized position data represents a localized position.

In some embodiments of the example method, the second time is during map construction. In some embodiments of the example method, the observed feature representation data is in a raw data format. In some embodiments of the example method, the observed feature representation data is in a pre-processed data format.

In some embodiments of the example method, the method further includes outputting the localized position data. In some embodiments of the example method, the trained localization neural network is a trained generative adversarial network. In some embodiments of the example method, the second feature decay and the third feature decay are associated with a shared overall feature context Another example embodiment includes a computer program product including at least one non-transitory computer-readable storage medium having computer-executable program code instructions stored therein. The computer-executable program code instructions are configured for receiving observed feature representation data, where the observed feature representation data represents an observed feature representation captured by a sensor at a first time. In the example computer program product, the observed feature representation includes an environment feature affected by a first feature decay. In the example computer program product, the program code instructions are further configured for transforming the observed feature representation data into standardized feature representation data utilizing a trained localization neural network. In the example computer program product, the standardized feature representation data represents a standardized feature representation including the environment feature affected by a second feature decay, where the environment feature affected by the second feature decay approximates the environment feature affected by a third feature decay associated with a map feature representation captured at a second time. In the example computer program product, the program code instructions are further configured for comparing, utilizing a comparison function, the standardized feature representation data and map feature representation data, where the map feature representation data represents the map feature representation captured at the second time. In the example computer program product, the program code instructions are further configured for identifying localized position data based on the comparison of the standardized feature representation data and the map feature representation data, where the localized position data represents a localized position.

In some embodiments of the example computer program product, the second time is during map construction. In some embodiments of the example computer program product, the observed feature representation data is in a raw data format. In some embodiments of the computer program product, the observed feature representation data is in a pre-processed data format.

In some embodiments of the computer program product, the program code instructions are further configured for outputting the localized position data. In some embodiments of the computer program product, the trained localization neural network is a trained generative adversarial network.

BRIEF DESCRIPTION OF THE DRAWINGS

Figure 1:
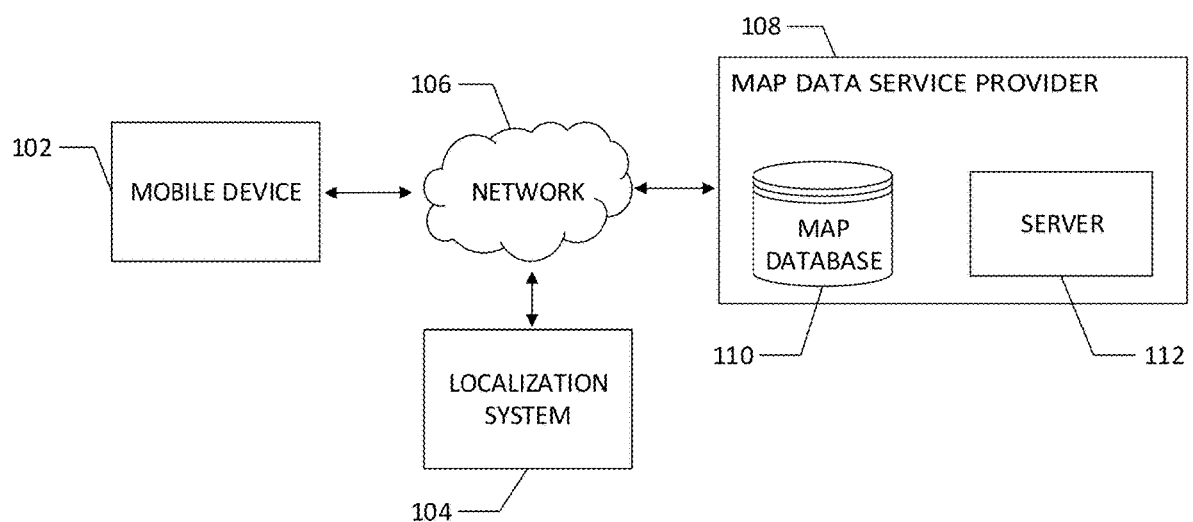
Figure 2:
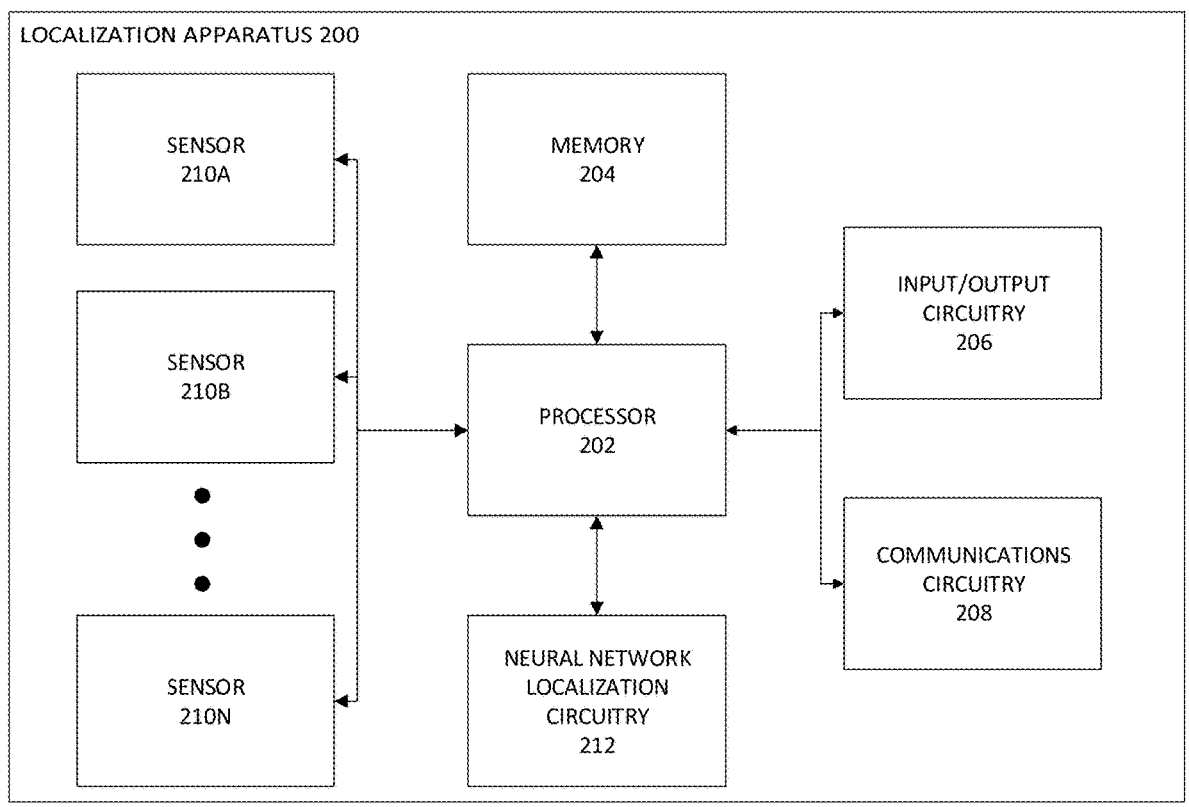
Figure 3:
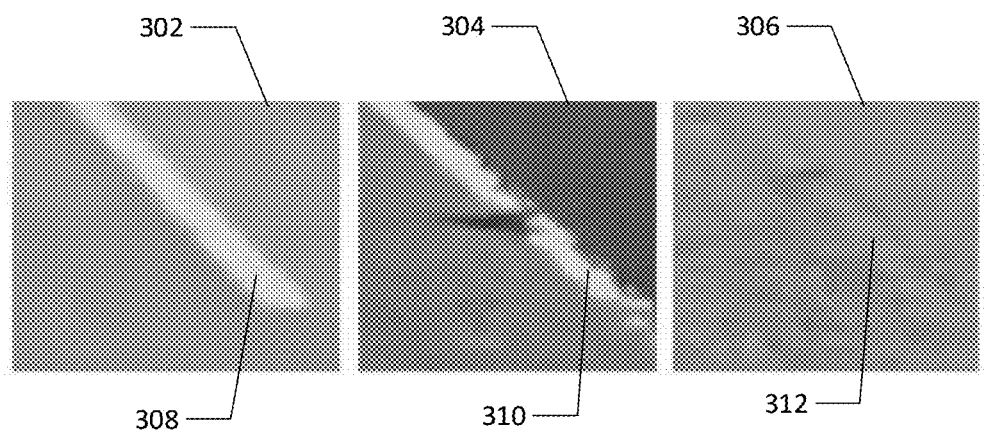
Figure 4:
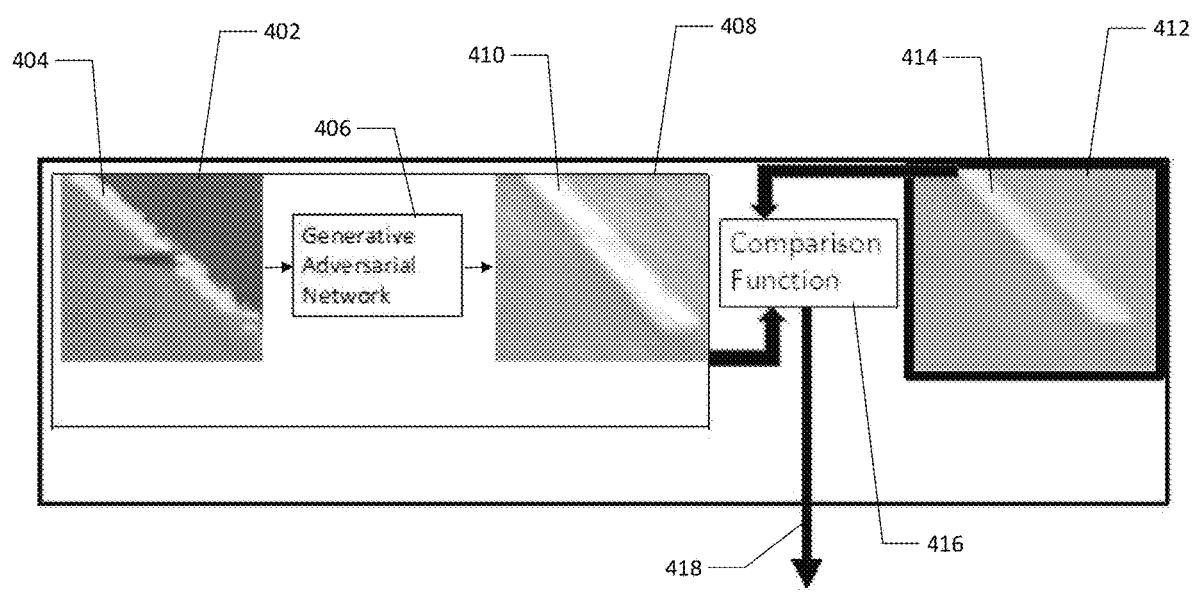
Figure 5:
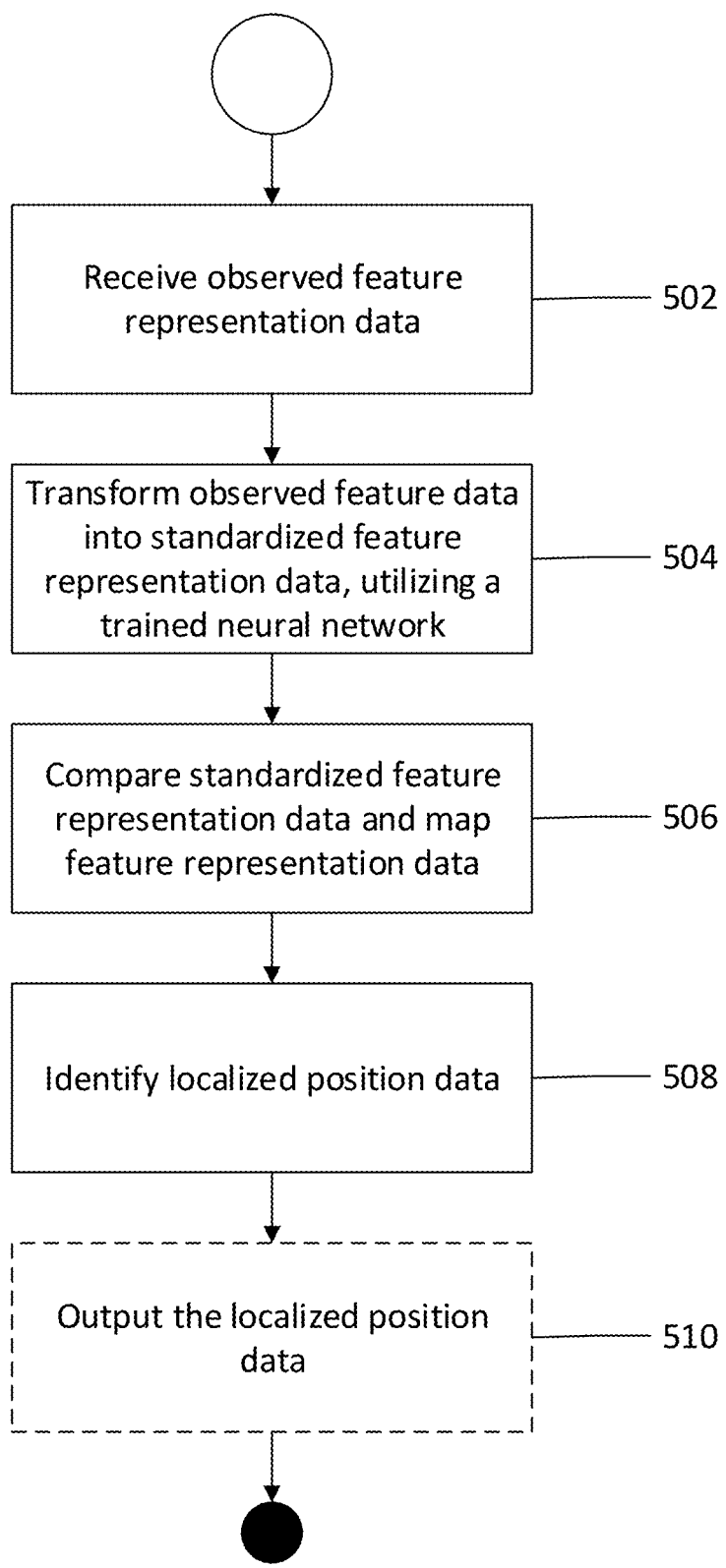

Having thus described certain example embodiments of the present invention in general terms, reference will hereinafter be made to the accompanying drawings which are not necessarily drawn to scale, and wherein:

FIG. 1 is a block diagram of a system for position localization in which an example embodiment of the present invention may operate;

FIG. 2 is a block diagram of an apparatus according to an example embodiment of the present invention;

FIG. 3 depicts feature space decay for a single, sample feature in accordance with an example embodiment of the present invention;

FIG. 4 illustrates a visualization of an example embodiment described herein; and FIG. 5 illustrates a flowchart of a method in accordance with an example embodiment of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data", "content", "information", and similar terms may be used interchangeably to refer to data capable of being captured, transmitted, received, displayed, and/or stored in accordance with various example embodiments. Thus, use of any such terms should not be taken to limit the spirit and scope of the disclosure. Further, where a computing device is described herein to receive data from another computing device, it will be appreciated that the data may be received directly from another computing device, or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to another computing device or it may be sent indirectly via one or more intermediary computing devices, such as, for example, one or more servers, relays, routers, network access points, base stations, and/or the like.

Overview

Autonomous vehicle operation relies on at least one environment map. The environment often includes a plurality of environment observation representations ("map feature representations") captured before constructing the environment map. For example, an example environment map may include representations of lane markers, exit signs, street signs, crosswalks, and the like, captured during an initial drive by one or more capture vehicles. These map feature representations include environment features and/or markers that are helpful in determining where a particular, localized position lies in the environment map. Utilizing the plurality of map feature representations, the environment map serves as an archival environment map for localization.

Autonomous vehicles perform vehicle localization to determine the position of the vehicle, or group of vehicles, with respect to an environment map. During vehicle localization, sensor data is captured. The captured sensor data often represents observed feature representation. For example, a camera sensor on an autonomous vehicle captures an image of the road including a lane marker. When observed feature representations are positively compared to map feature representations, the autonomous vehicle may utilize that positive comparison to determine a localized position.

However, in a given observed feature representation, an observed featured may not appear similar to its appearance in a map feature representation. For example, a lane marker freshly painted at the time a particular environment map may have degraded due to road use, weathering, or other feature decay, and thus be less visible than the corresponding version stored in the environment map. Visual changes in a feature makes directly comparing the observed feature representation (e.g., weathered and worn down) to the map feature representation (e.g., new and freshly painted) unlikely to yield an accurate result. Accordingly, vehicle localization that relies on accurately detecting and interpreting observed feature representations to match their corresponding map feature representations will similarly be inaccurate.

Various embodiments of the disclosure relate to vehicle localization using a neural network to transform an observed feature representation into standardized feature representation data. In an example embodiment, a neural network is trained to transform observed lane marker representations into a standardized representation. In an example embodiment, a standardized representation is associated with an overall context, for example associated weather conditions, an associated feature decay, associated lighting conditions, etc, associated with a stored map feature representation. In a particular example embodiment, a standardized representation of a lane marker is associated with an overall context of "summer-like conditions, with fresh paint." In some embodiments, comparing the standardized feature representation and a map feature representation allows for identifying a localized position.

Definitions

The term "environment feature" refers to a visual indicator for use in navigating, controlling, or otherwise utilizing an autonomous vehicle. Examples of environment features include, but are not limited to, lane markers, sign posts, stop signs, crosswalks, yield signs, and the like.

The term "feature decay" refers to degradation of an environment feature between two times at which the environment feature is observed. Examples of feature decay are fading of an environment feature due to use, fading of an environment feature due to weather, obscuring of an environment feature due to time, or the like. For example, a lane marker may have associated feature decay indicating no degradation when the environment feature is fully visible (e.g., when it is freshly painted), and a lane marker may have an associated feature decay indicating significant degradation when the lane marker is barely visible (e.g., when paint has eroded due to time and/or inclement weather).

The term "sensor" refers to a hardware component or system configured to capture one or more representations of an environment. Examples of sensors include, but are not limited to, cameras, Light Detection and Ranging (LiDAR) systems, radar, and the like. In some embodiments, a sensor outputs representation data that represents a particular representation of the environment captured by the sensor. In some embodiments, the environment feature representation includes one or more environment features.

The term "observed feature representation" refers to a particular capture of an environment by a sensor, wherein the particular capture includes an environment feature associated with an observed feature decay. In some example embodiments, sensors capture observed feature representations in real-time. In some embodiments, an observed feature representation is associated with significant feature decay, such that the environment feature included in the representation is barely visible. Data representing an observed feature representation is referred to as "observed feature representation data."

The term "map feature representation" refers to a particular capture of an environment by a sensor during map construction, wherein the particular capture includes an environment feature associated with a feature decay. In some embodiments, a map representation includes an environment feature that is associated with minimal feature decay. For example, an example map representation including a lane marker may be captured during map construction, wherein the lane marker is freshly painted. In some embodiments, a map representation includes an environment feature that is associated with significant feature decay. For example, an example map representation including a lane marker may be captured during map construction, wherein the lane marker is barely visible. Data representing a map feature representation is referred to as "map feature representation data."

The term "standardized feature representation" refers to a capture generated utilizing a neural network that approximates a map feature representation based on an observed feature representation. In some embodiments, each of (1) the standardized feature representation, (2) the observed feature representation that the standardized feature representation is based on, and (3) the map feature representation being approximated, each are associated with their own feature decay. In some embodiments, the map feature representation and standardized feature representation are associated with the same feature decay. In some embodiments, a neural network is trained to generate a standardized feature representation by transforming an observed feature representation, such as by applying a learned transformation function. For example, in a particular example embodiment, a trained neural network transforms an observed feature representation including a lane marker associated with significant feature decay (e.g., a lane marker barely visible) into a standardized feature representation including a lane marker associated with minimal feature decay (e.g., a lane marker freshly painted) that approximates a map feature representation including a lane marker associated with minimal feature decay (e.g., a lane marker freshly painted). Data representing a standardized feature representation is referred to as "standardized feature representation data."

Accordingly, the term "environment feature representation" refers generally to any map feature representation, observed feature representation, or standardized feature representation.

The term "environment map" refers to a set of stored map feature representations, such that the set of stored map feature representations represent a real-world environment. In some embodiments, a particular feature decay is associated with each stored environment feature representation in the set of stored map feature representations. In some embodiments, feature representations stored in an environment map are accessible for comparison with observed feature representations used in vehicle localization to determine an accurate position of a vehicle. An example environment map is a high-definition ("HD") map.

The term "localized position" refers to an identified position of a vehicle or group of capture vehicles associated with one or more environment maps. In some embodiments, a localized position is determined using a localization process utilizing a comparison function. For example, in some embodiments, a standardized feature representation based on an observed feature representation is compared with a map feature representation stored in an environment map, such that a corresponding region in the environment map where the two are deemed a match by the comparison function corresponds to the localized position of a vehicle, or group of vehicles, configured to capture the observed feature representation utilizing a particular sensor. Data representing a particular localized position is referred to as "localized position data."

Technical Underpinnings and Implementations of Example Embodiments

A neural network vehicle localization apparatus identifies a localized position of a vehicle using a trained neural network. Some embodiments receive observed feature representation data, transform the observed feature representation data into standardized feature representation data utilizing a trained neural network, wherein the standardized feature representation data represents a standardized feature representation that approximates a map feature representation, compare the standardized feature representation data with map feature representation data, wherein the map feature representation data represents the map feature representation, and identify localized position data, wherein the localized position data represents a localized position in an environment map.

An environment map may store static map feature representations captured during map construction. These stored static map feature representations may be used to localize the position of a vehicle or group of vehicles by comparing one or more observed feature representations with corresponding map feature representations stored in the environment map. If the observed feature representations match with the corresponding map feature representations stored in the environment map for a particular position, that position is the localized position of the vehicle or group of vehicles.

Accordingly, accurately comparing observed feature representations to their corresponding map feature representations helps to accurately identify a localized position for a vehicle or group of vehicles. Similarly, accurate results from comparison between an observed feature representation and a map feature representation is also advantageous, such that a particular environment feature should be deemed a match to its corresponding map feature representation every time a vehicle is at a particular position.

However, changes in feature decay pose challenges for accurately matching observed feature representations to their corresponding map feature representation. For example, a lane marker may have been freshly painted in a clear summer day when an environment map was constructed, and later captured in a real-time observed feature representation when the lane marker has been slightly eroded on a stormy winter day. Such significant feature decay makes comparison between the observed feature representation and the mapped feature representation likely to be inaccurate if directly compared.

By standardizing observed feature representation data, the method, apparatus, and computer program product of example embodiments of the present invention are configured to robustly perform comparisons. For example, even if an observed feature representation is associated with severe feature decay, for example such that the environment feature is barely visible, no re-parameterizing is required to accurately perform the comparison. Accordingly, the method, apparatus, and computer program product of example embodiment systems improve efficiency and efficacy of such comparisons. Similarly, the method, apparatus, and computer program product of example embodiment systems are more robust than traditional systems in handling real-time changes in observed feature representations from corresponding map feature representations in an environment map.

Additionally, the method, apparatus, and computer program product of example embodiment systems do not require transformation of observed feature representations into a particular representation type, such as a vector-representation. The method, apparatus, and computer program product of an example embodiment makes no assumptions about the representation type associated with a map feature representation stored in an environment map. Thus, the method, apparatus, and computer program product of some example embodiments assume that the environment map comprises a raw, registered data-dump of sensor readings. The method, apparatus, and computer program product of some embodiments are configured to operate when an environment map is constructed using map feature representations stored in processed data formats, for example a polyline representation.

System Architecture

Methods, apparatuses, and computer program products of an example embodiment may be embodied by any of a variety of devices. For example, the method, apparatus, and computer program product of an example embodiment may be embodied by a network device, such as a server or other entity, configured to communicate with one or more devices, such as one or more vehicles, systems, or user devices. Additionally or alternatively, the method, apparatus, and computer program product of an example embodiment may be embodied by one or more computing devices having one or more software modules or otherwise being configured to carry out all or some of the operations disclosed herein.

In this regard, FIG. 1 is a block diagram showing an example system in which embodiments of the present invention may operate. An example system includes mobile device 102, localization system 104, and map data service provider 108. Each of the mobile device 102, localization system 104, and map data service provider 108 may be in communication with at least one of the other elements illustrated in FIG. 1 via a network 106, which may be in any form of wireless or partially wireless network. Additional, different, or fewer components are provided in alternative systems. For example, a plurality of capture devices similar to the mobile device 102 may connect with the network 106. The map data service provider 108 may be a cloud-based service provider and/or may operate via a hosting server that receives, processes, and provides data to other elements in the system.

Mobile device 102 may be embodied or otherwise onboard an autonomous vehicle including a plurality of sensors, such that the autonomous vehicle is configured to capture representations of a surrounding environment utilizing the plurality of sensors. Mobile device 102 may alternatively be a mobile user device, such as a smart phone, or the like, configured to perform mapping capabilities. In an example system, mobile device 102 may include, be associated with, or otherwise be in communication with a plurality of sensors configured to capture a surrounding environment. In some embodiments, the plurality of sensors are configured to capture observed feature representations and transmit observed feature representation data for transformation in real-time.

The map data service provider 108 includes map database 110 that includes one or more stored environment maps. In some embodiment systems, map database 110 may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider 108, and may be accessed, for example, by the map data service provider server 112. By way of example, the map data service provider 108 may collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by one or more vehicles, such as by one or more mobile device 102, as they travel the roads throughout a region.

The map database 110 may be a master map database, such as an high-definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 102, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database. In alternate embodiments, a client side map database may represent a compiled navigation database that may be used in or with end user devices (e.g., mobile device 102) to provide navigation and/or map-related functions. For example, the map database 110 may be used with the mobile device 102 to provide an end user with navigation features. In such a case, the map database 110 can be downloaded or stored on the end user device which can access the map database 110 through a wireless or wired connection, such as via server 112 and/or the network 106 for example.

In one embodiment, as noted above, the mobile device 102 or end user device can embody, or otherwise be in communication or associated with the apparatus 200 of FIG. 2, which, in turn, may be embodied by or otherwise be in communication with an Advanced Driver Assistance System (ADAS) which may include an infotainment in-vehicle system or an in-vehicle navigation system of a vehicle, such as an autonomous or semi-autonomous vehicle, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 102 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to road ways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by more than one map data service provider 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

In an example embodiment, the map database 110 at least stores an environment map, such as a HD map, which includes map feature representations captured at a first time, such as during construction of the environment map. In example systems where map database 110 stores an HD environment map that includes map feature representations captured at a first time, each map feature representation may be associated with a feature decay. The associated feature decay may be representative of weathering, wear, or other effect applied to the environment feature. The feature decay may be associated with a particular location of the feature (e.g., a left side of a lane marker is very worn), and/or an associated decay level/severity (e.g., a lane marker may be freshly painted, slightly worn, very worn, or severely/totally worn/decayed).

In some embodiments, localization system 104 is a sub-system of mobile device 102. However, in other embodiments, localization system 104 is a sub-system of map data service provider 108. In further embodiments, localization system 104 comprises sub-modules of both mobile device 102 and map data service provider 108.

The localization system may be embodied by one or more computing systems, such as localization apparatus 200 depicted in FIG. 2. As illustrated in FIG. 2, the apparatus 200 may include one or more of a processor 202, a memory 204, input/output circuitry 206, communications circuitry 208, a plurality of sensors 210A-210N, and neural network localization circuitry 212. The apparatus 200 may be configured to execute the operations described above with respect to FIG. 1 and below with respect to FIGS. 4 and 5. Although these components 202-212 are described with respect to the performance of various functions, it should be understood that the particular implementations necessarily include the use of particular hardware. It should also be understood that certain of these components 202-212 may include similar or common hardware. For example, two modules/circuitry may both leverage use of the same processor, network interface, storage medium, or the like to perform their associated functions, such that duplicate hardware is not required for each module. The use of the terms "module" and "circuitry" as used herein with respect to components of the apparatus therefore includes particular hardware configured to perform the functions associated with the particular module described herein.

Of course, the terms "module" and "circuitry" should be understood broadly to include hardware. In some embodiments, circuitry may also include software for configuring the hardware. For example, in some embodiments, "module" and/or "circuitry" may include processing circuitry, storage media, network interfaces, input/output devices, and the like. In some embodiments, other elements of the apparatus 200 may provide or supplement the functionality of particular module(s). For example, the processor 202 may provide processing functionality, the memory 204 may provide storage functionality, the communications circuitry 208 may provide network interface functionality, and the like.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the terms "processing module" and/or "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may optionally include input/output circuitry 206 that may, in turn, be in communication with processor 202 to provide output to the user and, in some embodiments, to receive an indication from the user. The input/output circuitry 206 may comprise user interface associated with a hardware and/or software display. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device, module, or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In some embodiments, apparatus 200 may include, be associated with, or in communication with, one or more sensors, such as sensors 210A-210N, designed to capture an environment including environment features. Example sensors may include a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 200, such as by a proximity-based communication technique, such as near field communication (NFC) including, but not limited to, Bluetooth™ communication, or the like. Multiple sensors of the sensors 210A-210N may be utilized to capture a particular environment representation. In some embodiments, sensors 210A-210N may communicate with other apparatus components, such as the neural network localization circuitry 212, input/output circuitry 206, or communications circuitry 208, such as via processor 202.

Neural network localization circuitry 212 includes hardware and/or software components configured to transform an observed feature representation into a standardized feature representation that approximates a map feature representation. In some embodiments, neural network localization circuitry 212 embodies a neural network that has been trained to receive observed feature representation data, such as through communications from sensors 210A-210N via processor 202, for transforming. Neural network localization circuitry 212 may utilize one or more other modules or circuitry, such as communications circuitry 208, to receive and/or transmit data. For example, in an example embodiment, neural network localization circuitry 212 communicates with communications circuitry 208 via processor 202 to receive map feature representation data for use in training a neural network.

Neural network localization circuitry 212 may, for instance, utilize, or be embodied by a processing module, such as processor 202, to perform the above operations, and may further utilize any of the other modules, such as communications circuitry 208, for their purposes as described herein to perform the above operations. It should be appreciated that, in some embodiments, the neural network localization circuitry 212 may include a separate processor, specially configured field programmable gate array (FPGA), or application specific interface circuit (ASIC) to perform the above functions.

The apparatus 200 and, more specifically, the processor 202 and/or the neural network localization circuitry may operate under control of computer program instructions, as may be stored by the memory 204. As will be appreciated, any such computer program instructions and/or other type of code may be loaded onto a computer, processor, or other programmable apparatus' circuitry, such as the processor 202 and/or the neural network localization circuitry 212, to produce a machine, such that the computer, processor, or other programmable circuitry, such as the processor 202 and/or neural network localization circuitry 212, that executes the coded instructions on the machine creates the means for implementing various functions, including those described herein.

As described above and as will be appreciated based on this disclosure, embodiments of the present invention may be configured as a method, apparatus, computer program product, autonomous vehicle system, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example System Data Flow

FIG. 3 illustrates an example embodiment of feature space decay for an example feature, specifically exit signs. As depicted in FIG. 3, an environment feature representation 302 is captured by a sensor, such as an image sensor, of an environment of the sensor. In this example, the environment of the sensor is a roadway, and the detected feature is a lane marker 308. The lane marker 308 is, or appears, fresh, new, or otherwise visible. Accordingly, environment feature representation 302 may be associated with a feature decay indicating the environment feature, lane marker 308, is "freshly painted," for example. However, the lane marker becomes weathered, worn, and otherwise decays over time. Environment feature representation 304 illustrates a partial decay of the featured lane marker, specifically lane marker 310. Accordingly, environment feature representation 304 may be associated with a feature decay indicating the environment feature, lane marker 310, is "partially worn," for example. Environment feature representation 306 illustrates a significant decay of the featured lane marker, specifically lane marker 312. Accordingly, environment feature representation 306 may be associated with a feature decay indicating the environment feature, lane marker 312, is "total decay", for example. While each of the environment feature representations 302-306 correspond to the same location, each of the environment feature representations 302-306 corresponds to a captured representation (e.g., by a sensor) at a different time, and thus a different feature decay applies to each depicted environment feature representation 302-306.

Each map feature representation stored in an environment may be associated with any of the feature decays depicted in FIG. 3, or other feature decays not depicted. For example, an environment map may include one or more map feature representations of lane markers that are associated with a feature decay of "freshly painted", as well as one or more map feature representations of lane markers that are associated with a feature decay of "partially worn" or "total decay". Similarly, observed feature representations may be associated with a feature decay of "freshly painted", "partially worn", or "total decay" as well.

An overall context that defines the conditions of an environment feature representation may also be associated with a particular environment feature representation. An example overall context includes a weather descriptor and a feature decay associated with a particular environment feature representation. For example, if the environment feature representations 302-306 were captured on a sunny summer day, environment feature representation 302 may be associated with an overall context of "sunny summer conditions, freshly painted," environment feature representation 304 may be associated with an overall context of "sunny summer conditions, partially worn," and environment feature representation 306 may be associated with an overall context of "sunny summer conditions, total decay." Accordingly, an overall context associated with an environment feature representation may be utilized to compare environment feature representations, or transform an observed feature representation associated with a first overall context into a standardized feature representation associated with a second overall context. In some embodiments, an overall context includes a text label describing the feature decay associated with a particular environment feature. The overall context may, in some embodiments, be human created. An overall context may be associated with a unique identifier.

Additionally, it should be appreciated that the three depicted environment feature representations depicted in FIG. 3 are merely examples. In fact, feature decays different than those depicted in FIG. 3 can readily be determined by interpolating between the depicted environment feature representations. Accordingly, it should be understood that a particular environment feature may be visually affected by feature decay in a myriad of ways, such that a particular feature decay (e.g., "partially worn") refers to a portion of the myriad number of visual appearances. Thus, the illustrated example environment feature representations and corresponding feature decay descriptions are merely examples, and should not be taken to limit the spirit and scope of the disclosure.

Turning now to FIG. 4, a visualization of an example embodiment described herein is illustrated. As depicted, an observed feature representation 402 is captured including an environment feature, specifically lane marker 404. Observed feature representation 402 is associated with a first feature decay, specifically a first feature decay indicating the lane marker 404 is partially decayed. In some embodiments, observed feature representation 402 is captured by a single sensor, for example an image sensor or camera. In some embodiments, observed feature representation is captured by a plurality of sensors that cooperate to capture observed feature representation 402.

Observed feature representation data that represents the observed feature representation 402 is input into a neural network, specifically Generative Adversarial Network ("GAN") 406 as depicted. GAN 406 transforms the observed feature representation data to produce standardized feature representation 408. Standardized feature representation 408 includes an environment feature, specifically lane marker 410. Standardized feature representation 408 approximates map feature representation 412, such that the feature decay associated with map feature representation 412 is approximated by the standardized feature representation 408. Accordingly, lane marker 410 is an approximation of lane marker 414, such that feature decay affecting lane marker 410 serves to approximate the feature decay affecting lane marker 414.

As described above, observed feature representation 402 may be associated with a first overall context, for example "summer day conditions, partially worn." In some embodiments, standardized feature representation 408 may be associated with a second overall context, such as "sunny summer day, freshly painted." In some embodiments, the second overall context may match a third overall context associated with map feature representation 412. Accordingly, GAN 406, or a similar generative neural network, may be configured to transform an observed feature representation having any associated overall context into an approximation of the overall context associated with a map feature representation. In other words, in an example embodiment, for a stored map feature representation including a freshly painted lane line, a corresponding standardized feature representation output by a trained GAN, for example, approximates an observed feature representation, including the same lane line but more significantly decayed, as though the observed lane line were freshly painted (as it is in the map feature representation). Accordingly, the trained GAN approximates the overall context associated with a stored map feature representation for an input observed environment feature in an observed feature representation.

The standardized feature representation may be the best approximated feature matching the environment feature depicted in the map feature representation, such that the overall context of the standardized feature representation best approximates the overall context of the map feature representation. In some embodiments, to increase interpretability of an overall context for a human reader, an overall context is a string of text or characters, such as in the example above. Alternatively, in some embodiments, an overall context is associated with an overall context identifier, such as a unique numeric identifier or unique alphanumeric identifier, that corresponds to a particular overall context.

Standardized feature representation data that represents the standardized feature representation 408 is then used to perform a comparison function 416. Specifically, as depicted, comparison function 416 compares the standardized feature representation data, representing the output from the GAN, with map feature representation data, representing the map feature representation 412. The comparison function identifies a localized position by comparing the standardized feature representation data and the map feature representation data to find a match at a particular localized position in the map.

In some embodiments, the GAN 406, or a similar neural network, is trained using two environment feature representation sets: a first environment feature representation set, wherein each environment feature representation in the first environment feature representation set is associated with a first feature decay, and a second environment feature representation set, wherein each environment feature representation in the second environment feature representation set is associated with a second feature decay, different than the first feature decay. In some embodiments, the two collected environment feature representation sets include representations of the same environment feature captured at two different times, and thus associated with two distinct feature decays. For example, in some embodiments, the first environment feature representation set is collected during a first drive along a particular route, and the second environment feature representation set is collected during a second drive along the particular route. Collection of a first environment feature representation set may occur have occurred at any length of time from collection of a second environment feature representation set.

Each feature set may include one or more environment features associated with one or more feature decays. For example, a first environment feature representation set may include a set of lane lines, captured during the spring, that are freshly painted on a road, and a second environment feature representation set may include the same set of lane lines, captured during the following winter, that are slightly worn due to use and weather effects. A human operator may associate an overall context label with one or more, or each, environment feature representation in an environment feature representation set. For example, a human operator may associate an overall context label of "freshly painted" with each label in the first environment feature representation set. In some embodiments, each human-readable overall context applied by a human operator may represent a unique overall context identifier, allowing for both human interpretability and machine interpretability. In some embodiments, human interpretability of an overall context is not material. Accordingly, for each environment feature representation in an example environment feature representation set, each overall context may be automatically tagged with an overall context identifier, such as a unique alphanumeric identifier or unique numeric identifier. By automatically tagging one or more overall contexts, one or more captured environment feature representation sets may be automatically constructed with overall context labels without requiring human operators.

By providing a standardized feature representation as input to the comparison function using a neural network, such as GAN 406, the apparatus 200 of an example embodiment is robust in handling changes in feature decay associated with observed feature representations, regardless of the severity in changes in feature decay. Additionally, by providing a standardized feature representation as input to the comparison function, the apparatus 200 of an example embodiment automatically accounts for changes in feature decay without requiring re-parameterization by hand for hand-tuned feature space comparisons in instances of visual differences between environment feature representations.

Application Ser. No. 16/174,892 entitled "Method and Apparatus for Predicting Feature Space Decay Using Variational Auto-Encoder Networks", filed on Oct. 30, 2018, which is hereby incorporated by reference in its entirety, describes a number of example processes for training a localization neural network for outputting standardized feature representation data representing a standardized feature representation.

In some embodiments, localized position data 418 is produced and output by the apparatus 200.

As similarly described above with respect to FIG. 3, the particular environment feature representations 402, 408, and 412 are merely example feature definitions. In other embodiments, the observed feature representation 402, the standardized feature representation 408, and/or the map feature representation 412 is depicted differently, such as associated with a different feature decay. Accordingly, use of the depicted representations is merely by way of example, and such example depictions should not be taken to limit the spirit and scope of the disclosure FIG. 5 illustrates a flowchart depicting the operations performed, such as by apparatus 200, according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory, such as memory 204 of apparatus 200, and executed by a processor, such as processor 202 of the apparatus 200. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 5 is a flowchart of the operations performed, such as by apparatus 200, for position localization, specifically for position localization using a trained neural network. As depicted, at block 502, observed feature representation data is received. In some embodiments, the apparatus 200 includes means, such as the processor 202, the input/output circuitry 2006, the communications circuitry 208, a sensor 210 or the like, configured to receive the observed feature representation data is received from a sensor or a plurality of sensors. In some embodiments, the observed feature representation data represents raw sensor data, while in other embodiments, the observed feature representation data has undergone at least one pre-processing step, such that the observed feature representation data is in a pre-processed data format. In some embodiments, the observed feature representation data is directly transmitted from one or more sensors in real time.

At block 504, the apparatus 200 includes means, such as the processor 202, the neural network localization circuitry 212, or the like, configured to transform the observed feature representation data received at block 502 into standardized feature representation data utilizing a trained neural network. In some embodiments, the standardized feature representation data represents a standardized feature representation that approximates a map feature approximation associated with a particular feature decay. In some embodiments, the trained neural network is a Generative Adversarial Network ("GAN"). Regardless of its configuration, the neural network of an example embodiment is trained using at least two environment feature representation sets: a first environment feature representation set, wherein each environment feature representation in the first environment feature representation set is associated with a first feature decay, and a second environment feature representation set, wherein each environment feature representation in the second environment feature representation set is associated with a second feature decay. In some embodiments, the two collected environment feature representation sets correspond to one another, such that the each set contains representations that include the same environment features at two different times. For example, in some embodiments, the first environment feature representation set is collected during a first drive along a particular route, and the second environment feature representation set is collected during a second drive along the particular route.

In a particular example embodiment, a map feature representation including a lane marker may be associated with a feature decay of "freshly painted", and an observed feature representation including the lane marker may be associated with a different feature decay of "partially worn". Accordingly, an example embodiment, the trained neural network may transform observed feature representation data representing the observed feature representation described above into standardized feature representation data that represents a standardized feature representation that includes the lane marker affected by a new, standardized feature decay, which approximates the lane marker at the time/affected by the feature decay associated with the map feature representation.

At block 506, the apparatus 200 includes means, such as the processor 202, the neural network localization circuitry 212, or the like, configured to compare the standardized feature representation data and map feature representation data. In an example embodiment, the standardized feature representation data and map feature representation data are compared utilizing a comparison function implemented, for example, by the processor 202 or the neural network localization circuitry 212. In an example embodiment, the comparison function determines if the standardized feature representation data and the map feature representation data are a match. In another example embodiment, the comparison function determines if the standardized feature representation data and the map feature representation data a similarity relationship that represents a match based on a comparison threshold. In an example embodiment, the comparison function determines a match by minimizing an error function between the standardized feature representation data and the map feature representation data.

When a match is determined, the apparatus 200 includes means, such as the processor 202, the neural network localization circuitry 212, or the like, configured to identify localized position data. In some embodiments, the comparison function identifies and outputs a localized position, or corresponding localized position data representing the localized position, after determining a match. For example, in an example embodiment, a GPS position is received and used to perform a local search within a particular search field. In some embodiments, localized positions in the search field are utilized to determine if the standardized feature representation data matches the map feature representation data, and, if so, the localized position that best matches is identified.

By providing a standardized feature representation as input to the comparison function using a neural network, the method, apparatus 200, and computer program product of an example embodiment is robust in handling changes in feature decay associated with observed feature representations, regardless of the severity in changes in feature decay. Additionally, by providing a standardized feature representation as input to the comparison function, the method, apparatus 200, and computer program product of an example embodiment automatically accounts for changes in feature decay without requiring re-parameterization by hand for hand-tuned feature space comparisons in instances of visual differences between environment feature representations.

At optional block 510, the apparatus 200 includes means, such as the processor 202, the input/output circuitry 206, the communications circuitry 208, or the like, configured to output and/or store, such as in the memory 204, the identified localized position data. In other embodiments, the localized position data is output to a decision-making system. For example, the localized position data is output to a second system for further processing. In some embodiments, the localized position data of an example embodiment is output to a control or navigation system. For example, the control or navigation system may receive the localized position data and, through communication with a decision-making system, alter the steering of an autonomous vehicle based on the received localized position data to steer towards a destination location (e.g., to stay centered in a current lane), thereby providing for more accurate and reliable navigation.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although are described specific embodiments regarding lane markers, methods, apparatuses, and computer program products disclosed herein can be used in conjunction with a variety of environment features subject to decay over time (e.g., exit signs/street signs obscured by foliage, crosswalks worn over time, road sign text fading over time, and the like). Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for position localization comprising at least one processor and at least one non-transitory memory including computer program code instructions stored thereon, the computer program code instructions configured to, when executed, cause the apparatus to:
receive observed feature representation data, wherein the observed feature representation data represents an observed feature representation captured by a sensor at a first time, wherein the observed feature representation comprises an environment feature affected by a first feature decay;
transform the observed feature representation data into standardized feature representation data utilizing a trained localization neural network, wherein the standardized feature representation data represents a standardized feature representation comprising the environment feature affected by a second feature decay, wherein the environment feature affected by the second feature decay approximates the environment feature affected by a third feature decay associated with a map feature representation captured at a second time;
compare the standardized feature representation data and the map feature representation data, wherein the map feature representation data represents the map feature representation captured at the second time; and
identify localized position data based on the comparison of the standardized feature representation data and the map feature representation data, wherein the localized position data represents a localized position.

2. The apparatus according to claim 1 wherein the second time is during map construction.

3. The apparatus according to claim 1 wherein the observed feature representation data is in a raw data format.

4. The apparatus according to claim 1 wherein the observed feature representation data is in a pre-processed data format.

5. The apparatus according to claim 1 wherein the computer program code instructions are further configured to, when executed, cause the apparatus to output the localized position data.

6. The apparatus according to claim 1, wherein the trained localization neural network is a trained generative adversarial network.

7. The apparatus according to claim 1, wherein the second feature decay and the third feature decay are associated with a shared overall feature context.

8. A method for position localization comprising:
receiving observed feature representation data, wherein the observed feature representation data represents an observed feature representation captured by a sensor at a first time, wherein the observed feature representation comprises an environment feature affected by a first feature decay;
transforming the observed feature representation data into standardized feature representation data utilizing a trained localization neural network, wherein the standardized feature representation data represents a standardized feature representation comprising the environment feature affected by a second feature decay, wherein the environment feature affected by the second feature decay approximates the environment feature affected by a third feature decay associated with a map feature representation captured at a second time;
comparing, utilizing a comparison function, the standardized feature representation data and map feature representation data, wherein the map feature representation data represents the map feature representation captured at the second time; and
identifying localized position data based upon the comparison of the standardized feature representation data and the map feature representation data, wherein the localized position data represents a localized position.

9. The method according to claim 8 wherein the second time is during map construction.

10. The method according to claim 8 wherein the observed feature representation data is in a raw data format.

11. The method according to claim 8 wherein the observed feature representation data is in a pre-processed data format.

12. The method according to claim 8 further comprising outputting the localized position data.

13. The method according to claim 8, wherein the trained localization neural network is a trained generative adversarial network.

14. The method according to claim 8, wherein the second feature decay and the third feature decay are associated with a shared overall feature context.

15. A computer program product for position localization, the computer program product comprising at least one non-transitory computer-readable storage medium having computer-executable program code instructions stored therein, the computer-executable program code instructions comprising program code instructions for:
receiving observed feature representation data, wherein the observed feature representation data represents an observed feature representation captured by a sensor at a first time, wherein the observed feature representation comprises an environment feature affected by a first feature decay;
transforming the observed feature representation data into standardized feature representation data utilizing a trained localization neural network, wherein the standardized feature representation data represents a standardized feature representation comprising the environment feature affected by a second feature decay, wherein the environment feature affected by the second feature decay approximates the environment feature affected by a third feature decay associated with a map feature representation captured at a second time;

comparing, utilizing a comparison function, the standardized feature representation data and map feature representation data, wherein the map feature representation data represents the map feature representation captured at the second time; and identifying localized position data based on the comparison of the standardized feature representation data and the map feature representation data, wherein the localized position data represents a localized position.

16. The computer program product according to claim 15, wherein the second time is during map construction.

17. The computer program product according to claim 15 wherein the observed feature representation data is in a raw data format.

18. The computer program product according to claim 15 wherein the observed feature representation data is in a pre-processed data format.

19. The computer program product according to claim 15 further comprising program code instructions for outputting the localized position data.

20. The computer program product according to claim 15, wherein the trained localization neural network is a trained generative adversarial network.

* * * * *